(No Model.)
S. R. LEWIS.
CROSSCUT SAW.
No. 563,669. Patented July 7, 1896.
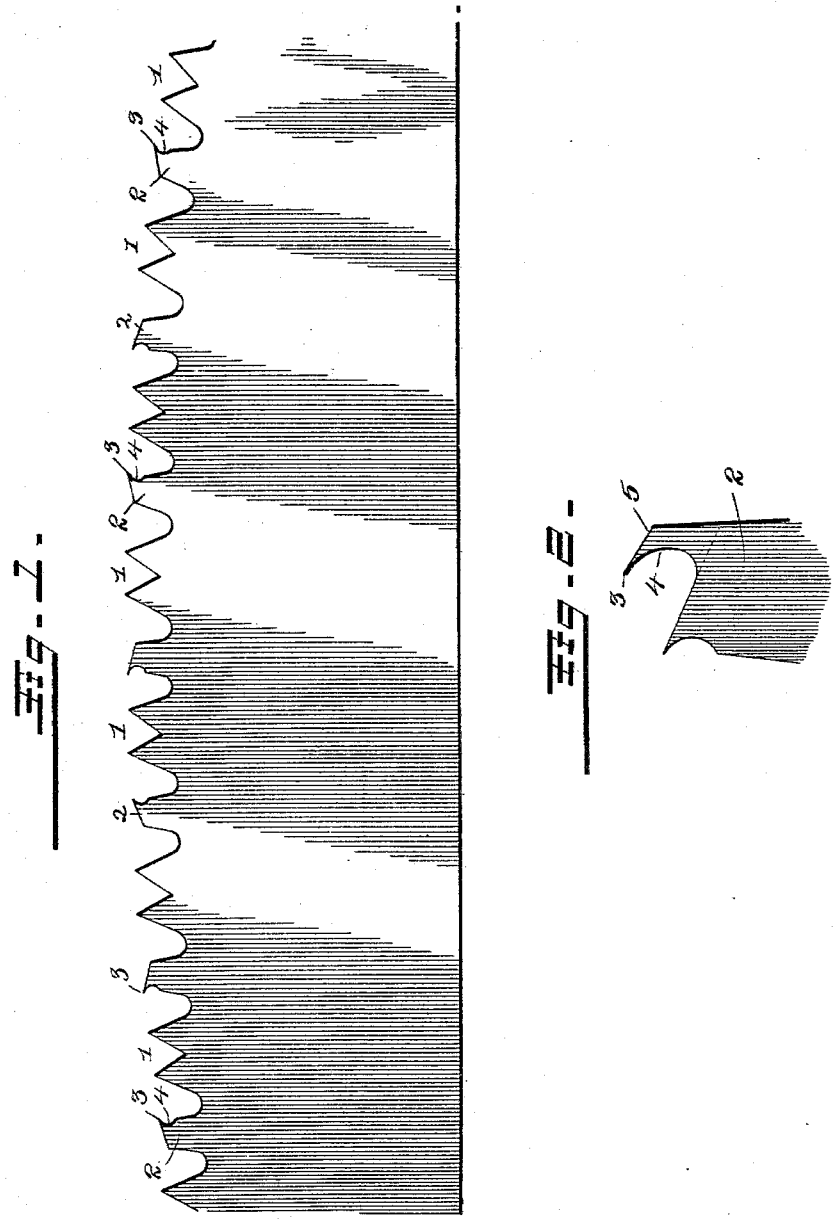
Witnesses
W. J. Koerth.
V. B. Hillyard.
Inventor
Sherwood R. Lewis,
By his Attorneys,
C. A. Snow & Co.

UNITED STATES PATENT OFFICE.

SHERWOOD R. LEWIS, OF HAINES FALLS, NEW YORK.

CROSSCUT-SAW.

SPECIFICATION forming part of Letters Patent No. 563,669, dated July 7, 1896.

Application filed October 2, 1895. Serial No. 564,413. (No model.)

*To all whom it may concern:*

Be it known that I, SHERWOOD R. LEWIS, a citizen of the United States, residing at Haines Falls, in the county of Greene and State of New York, have invented a new and useful Crosscut-Saw, of which the following is a specification.

This invention relates to crosscut-saws, and most especially to the manner of disposing and forming the raker-teeth, whereby a less number of teeth can be provided on a saw of given length and size, and whereby the work is facilitated and the saw prevented from gumming or choking.

The cut produced by a saw of this invention is smooth, and less power is required to operate the saw, and the kerf made is formed by a dado cut, which, as is well known, is smoother and more easily formed than where the cuttings are scraped in the formation of the kerf.

Other objects and advantages are contemplated, and to this end the improvement consists, essentially, of the novel features which hereinafter will be more particularly illustrated, set forth, and claimed.

In the drawings, Figure 1 is a detail view of a portion of a crosscut-saw constructed in accordance with this invention. Fig. 2 represents a raker-tooth having one course nearly worn away and a new course started.

The saw is provided at intervals in its length with M-teeth 1 of usual formation and raker-teeth 2 intermediate of the M-teeth. The raker-teeth on opposite sides of each alternate M-tooth have their outer ends oppositely inclined, so as to provide chisel edges 3, facing the M-tooth located between the pair of raker-teeth. A recess 4 is provided in the edge of the raker-teeth immediately below the chisel edges 3, and is preferably of semicircular form to prevent the crinkling of the shavings and cause them the better to clear the raker-teeth in the operation of the saw. The inner ends of the spaces between the M-teeth and the raker-teeth are round, and the edges of the raker-teeth extend approximately in parallelism.

In sharpening a saw of this character a rat-tail or half-round file is used, and the recess 4 is deepened, thereby securing the requisite chisel edge to each raker-tooth. The sharpening or filing will be continued across the upper edge of each raker-tooth, as shown in Fig. 2, and after the upper portion is rendered sufficiently thin to be incapable of safe use, as shown at 5 in Fig. 2, it is removed on the dotted lines and a new recess is formed, thereby starting another course across the end of each raker-tooth, as clearly indicated in the said Fig. 2.

By having the recesses 4 curved a sharp chisel or cutting edge is had and the shavings clear the teeth more readily in the operation of the saw.

Having thus described the invention, what is claimed as new is—

1. A saw provided with teeth having their outer ends cut straight across and inclining between their edges to the line of cut, and having semicircular filing-recesses in the edges adjacent to the cutting ends and intersecting with the said inclined ends to form chisel edges, give proper direction to the cuttings, and adapted to receive and guide the file when sharpening the teeth, substantially as set forth.

2. A crosscut-saw having M-teeth and raker-teeth between the M-teeth, the raker-teeth on opposite sides of each alternate M-tooth having their outer ends cut straight across and oppositely inclining to the line of cut, and having approximately semicircular filing-recesses in the edges adjacent to the cutting-points and intersecting with the said inclined ends to form chisel edges, give proper direction to the cuttings, and adapted to receive and guide the file when sharpening the teeth, substantially in the manner specified.

In testimony that I claim the foregoing as my own I have hereto affixed my signature in the presence of two witnesses.

SHERWOOD R. LEWIS.

Witnesses:
FREDERICK F. CAMPBELL,
G. J. BAILEY.